J. W. AND G. F. BURGESS.
TIRE.
APPLICATION FILED FEB. 18, 1919.
1,313,254.
Patented Aug. 19, 1919.
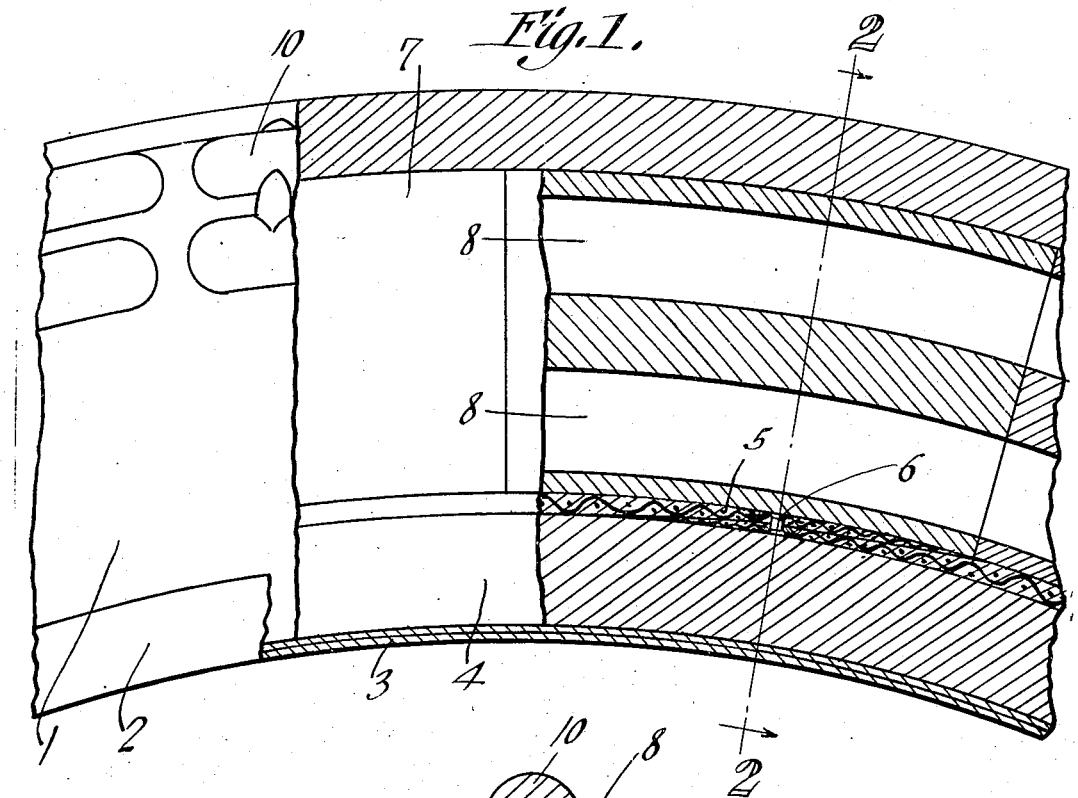
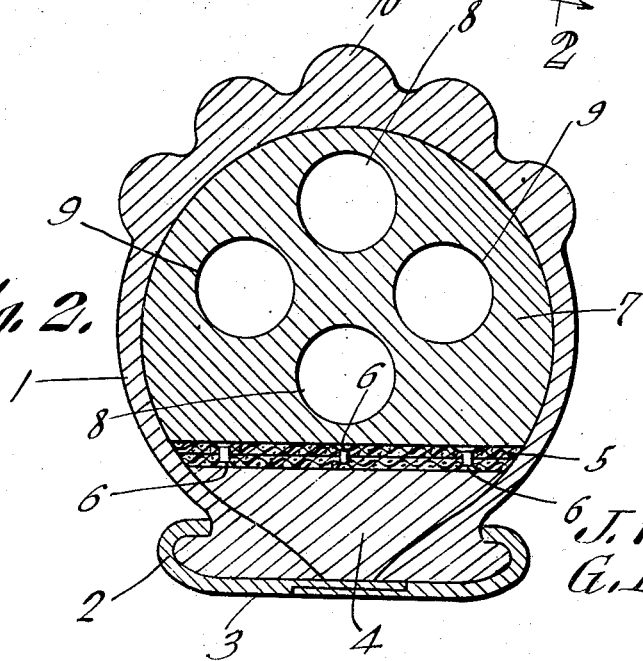
J. W. Burgess and
G. F. Burgess
Inventors

UNITED STATES PATENT OFFICE.

JOHN W. BURGESS AND GEORGE F. BURGESS, OF KANSAS CITY, MISSOURI.

TIRE.

1,313,254.  Specification of Letters Patent.  Patented Aug. 19, 1919.

Application filed February 18, 1919. Serial No. 277,835.

*To all whom it may concern:*

Be it known that we, JOHN W. BURGESS and GEORGE F. BURGESS, citizens of the United States, residing at Kansas City, in the county of Jackson, State of Missouri, have invented a new and useful Tire, of which the following is a specification.

The device forming the subject of this application is a tire, and the invention aims specifically, to provide a filler which will possess great resiliency, combined with strength, and approximate closely, the operation of a pneumatic tube, avoiding, however, the disadvantages attendant upon puncture and deterioration of an inflatable tube.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention, parts being broken away; Fig. 2 is a cross section on the line 2—2 of Fig. 1.

In the drawings, the numeral 1 denotes a tire casing held by any suitable means 2 on a rim 3, the casing 1 being supplied with an anti-skid surface 10 of any selected sort. A resilient strip 4 preferably made of rubber, extends circumferentially of the structure, between the inner edges of the casing 1, and may bear upon the rim 3, between the inner edges of the tire casing. The strip 4 conforms closely to the cross section of the casing 1 and, in the present instance, but not of necessity, is of approximate V-shape in cross section. The strip 4 is retained by a circumscribing band 5, the ends of which may be united by rivets 6 or in any other suitable way. Located within the tire casing 1 and coöperating with the band 5 is a resilient body, made of rubber, if desired, the body including a plurality of blocks 7 having their ends in abutment, the blocks being disposed circumferentially of the structure. The blocks may be from two to eight inches in length. The blocks have alined circumferential openings 8 disposed in the median plane of the tire, and openings 9 are fashioned in the blocks on each side of the median plane.

There is a distinct advantage in forming the body portion of the filler out of a plurality of blocks such as the parts 7, in that each block may yield as a unit, to conform to the uneven surface of the highway, when the vehicle carrying the tire casing passes over a railroad track or other obstruction, and under like circumstances. The blocks 7 in effect, operate like so many springs, without possessing the disadvantages of springs, it being noted that the blocks are in terminal abutment, and that, therefore, the structure has circumferential stability combined with resiliency. Owing to the specific location of the openings 8 and 9 in the blocks, the resiliency will be afforded, without sacrificing resiliency to instability. The band 5 having its ends connected, renders it unnecessary to place the blocks 7 in the casing 1 under compression, it being obvious that if the blocks are mounted in the casing under compression, the resiliency of the device will be impaired to a considerable extent. The structure is so made up that it will absorb shocks due to a vertical load and at the same time will avoid excessive vibration. Since the blocks 7, when placed in the casing 1 are not under compression, the tire will have lateral resiliency, as well as the desired resiliency in a vertical direction. The construction of the device is such that it will yield sufficiently in a lateral direction, to overcome skidding. Especial attention is again directed to the fact that the band 5 is placed in the structure under tension, thereby confining the strip 4 and avoiding outward compressive pressure against the blocks 7, the blocks being in a natural or neutral state until a weight is imposed upon them, in operation.

The band 5 is inelastic, meaning thereby that it may bend transversely but not stretch appreciably in the direction of its length as, for instance, a rubber band might stretch.

Having thus described the invention, what is claimed is:

1. A tire comprising a casing; a resilient circumferential strip in the casing; an inelastic band surrounding the strip and under tension; and a body filling the casing between the band and the tread portion of the casing, the body being in the form of a plurality of relatively short resilient blocks having their ends in abutment.

2. A tire comprising a casing; a resilient circumferential strip in the casing; an inelastic band surrounding the strip and under tension; and a body filling the casing between the band and the tread portion of the casing, the body comprising a plurality of resilient blocks having their ends in abutment, the blocks being relatively short, and being provided with circumferential openings disposed symmetrically with respect to the median plane of the tire.

In testimony that we claim the foregoing as our own, we have hereto affixed our signatures in the presence of two witnesses.

JOHN W. BURGESS.
GEORGE F. BURGESS.

Witnesses:
CLARENCE E. CAMPBELL,
H. A. BURGESS.